Figure 1:
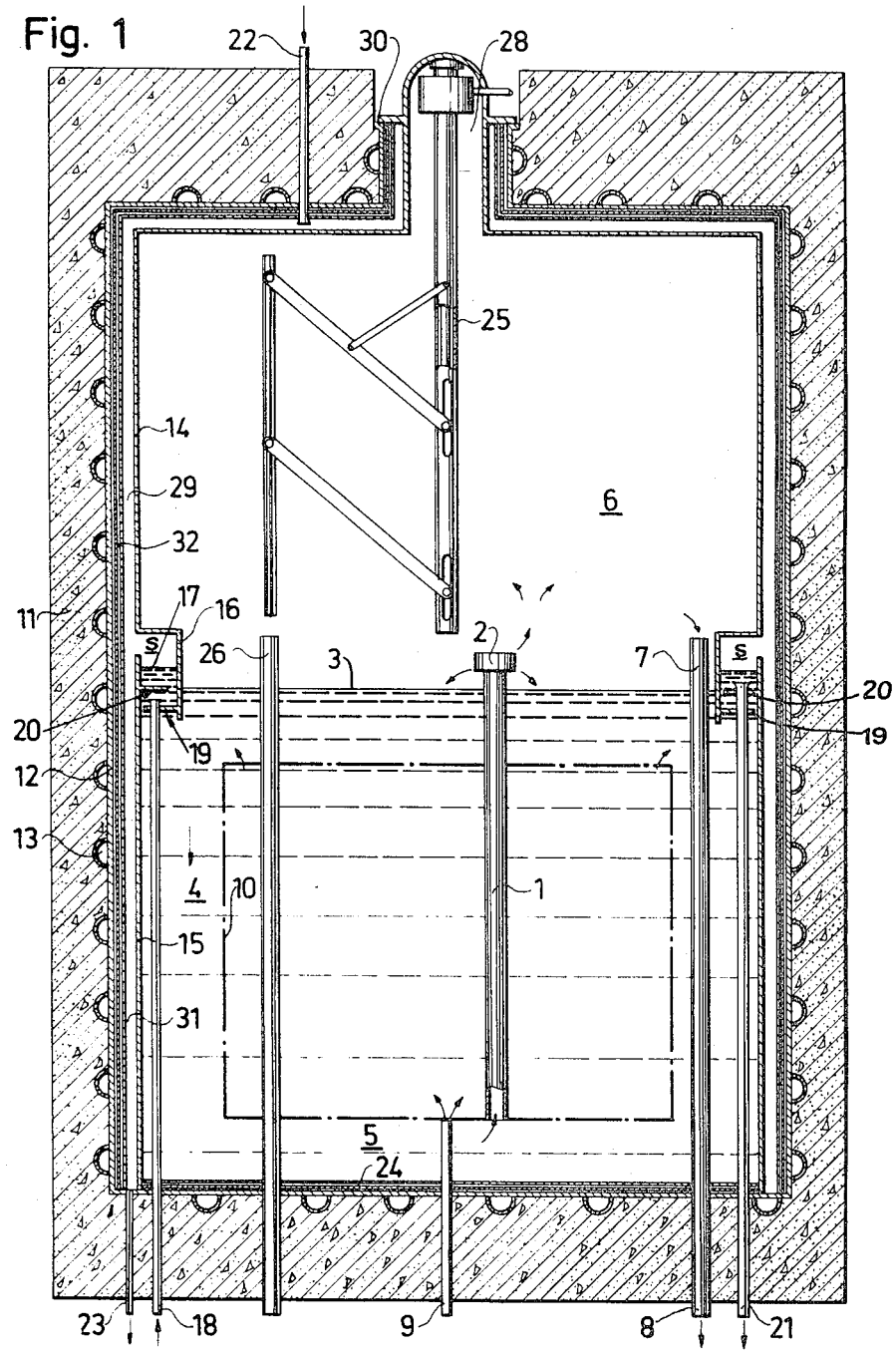

3,372,092
NUCLEAR REACTOR
Peter Heinrich Erwin Margen, Nasbypark, Sweden, assignor to Aktiebolaget Atomenergi, Stockholm, Sweden, a corporation of Sweden
Filed July 21, 1965, Ser. No. 473,668
Claims priority, application Sweden, Mar. 12, 1965, 3,285/65
11 Claims. (Cl. 176—52)

This invention relates to improvements in the structure of a vessel for conducting nuclear reactions of the hot water type.

During recent years, interest in the use of pressure vessels of prestressed concrete has increased with the increase in the size of reactors. Whilst this has been applied mainly for reactors cooled by gas, such pressure vessels also have an interest for reactors cooled by light or heavy water in the liquid or boiling form. For such reactors, the most important new problem is that of providing an adequate thermal insulation between the hot water and steam inside the pressure vessel and the concrete vessel.

For the gas cooled reactors, the thermal insulation between the cold inner steel lining of the concrete and the hot coolant gas is often provided by thin layers of steel foil, wire mesh or other known devices which restrict the circulation of the coolant gas in a narrow layer near the lining, thus creating stagnant layers of the coolant gas as an insulation. This form of insulation cannot be used for the steam space of heavy water reactors of the boiling or pressurized water type, as the steam would condense on the comparatively cold lining.

Another type of insulation used in gas cooled reactors is by the use of a porous concrete, for instance a porous pumice concrete, contained in the space between the cold outer lining and a flexible hot inner lining. This solution could also be used for the boiling or pressurized water reactors if porous concrete and flexible linings suitable for the very high pressures in such reactors were available. Materials which meet these requirements are not, however, at present available.

For boiling or pressurized water reactors it is possible to use stagnant layers of water separated by layers of steel foil or similar devices at the inside of the cold lining as an insulation below the water surface. Also for the steam space above the water surface it is possible to create a stagnant gap of water as insulation but only with the help of relatively complicated structures. The water insulation is, however, much inferior to gas insulation from the aspect of insulation properties per centimeter thickness, and when the reactor uses heavy water instead of ordinary water there is also a high cost for the heavy water in the insulation space.

The invention aims at eliminating the inconveniences mentioned above, and is concerned with providing a gas insulation in a water-cooled nuclear reactor without complicated mechanical means and without using an expensive, extra steel vessel. The nuclear reactor of the invention is characterized in that it comprises a pressure vessel, a water space in the bottom of the pressure vessel, a steam space in the top of the pressure vessel, a comparatively thin-walled shroud surrounding the steam space, a heat insulating gas space between the shroud and the wall of the pressure vessel, and a water seal for separating the steam from the heat-insulating gas.

Because of the water seal no significant pressure difference can arise between the interior of the reactor and the space for the heat-insulating gas, and the shroud can therefore be thin-walled. The shroud can be arranged so as to surround the steam space only. It is preferably arranged so as to surround the space for the cooling water as well as the space for steam.

Figure 2:
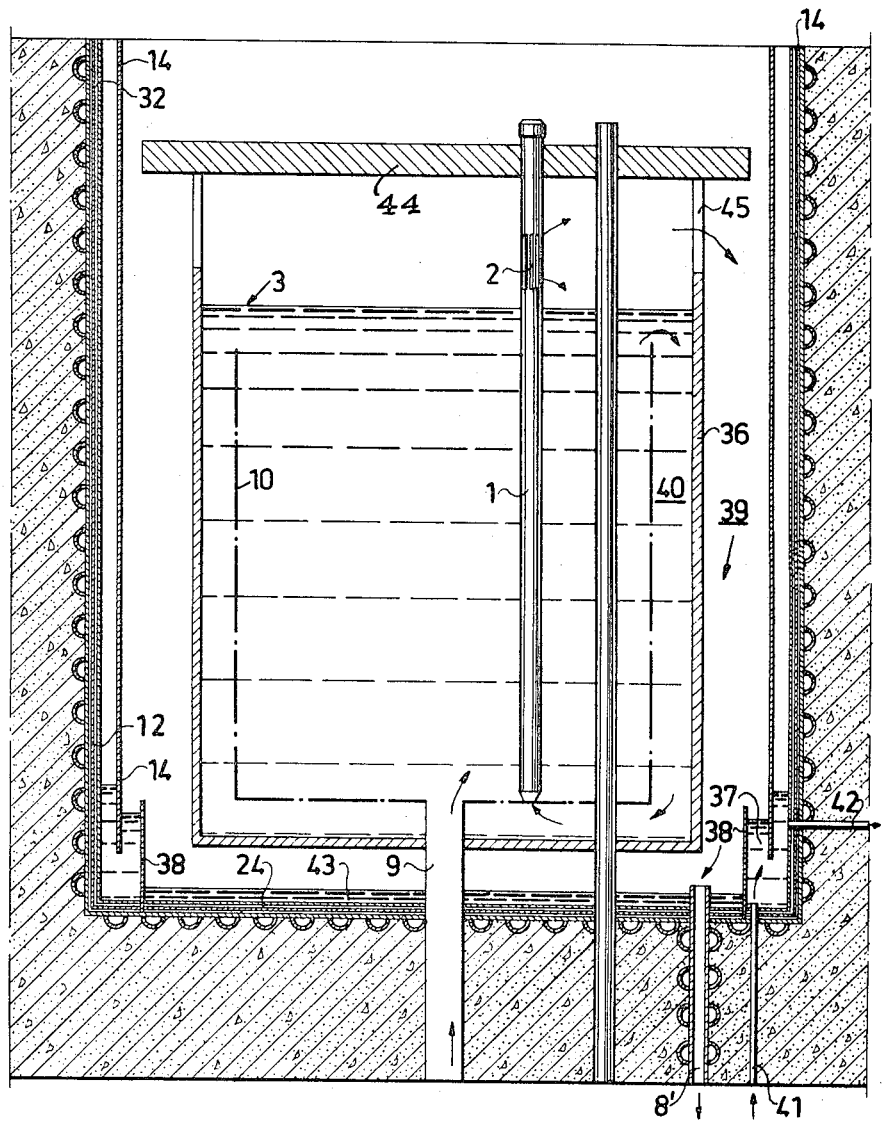

The invention will now be described with reference to the accompanying drawings which illustrate two embodiments of the reactor of the invention in which:

FIG. 1 is a vertical sectional view through a reactor embodying concepts of the present invention, and FIG. 2 is a vertical sectional view through the bottom part, only, of a modified form of reactor structure illustrating a further feature of the invention.

The reactor illustrated in FIG. 1 contains a pressure vessel 11 consisting of pre-stressed concrete. The inside of the pressure vessel is covered by a steel lining 12 to which are welded tubes 13 for cooling water, for keeping the concrete at a temperature below 70° C. The pressure vessel contains a tank, outlined at 10 in this figure by dot-and-dash line, which defines the reactor core. The core contains a fissile fuel in a plurality of vertical tubes 1, only one of said tubes being illustrated for the sake of simplicity. Said tubes have separators 2 at their tops for separating steam and water. Feed water is supplied to the reactor through a conduit 9. The water flows upward through the reactor core 10, acting as moderator, mixes with hot water from the steam separators 2, flows downward through the space 4 surrounding the reactor core into an entry plenum 5 below the reactor core, and flows upward through the tubes 1 while being brought to boil. The steam flows from the steam space 6 downward through tubes 7 situated around the reactor core 10 proper. The steam leaves the reactor through tubes which, in this embodiment, are shown at 8 as terminal portions of steam tubes 7.

A comparatively thin-walled shroud 14 of sheet steel surrounds the steam space 6 so as to define between the lining 12 and the shroud 14 a comparatively narrow insulating space 29. The top of the shroud is welded at 30 to the lining 12. The lower portion of the shroud 14 has a portion 16 of a reduced diameter, extending below the normal water surface 3 in the reactor. A corresponding thin-walled shroud 15 surrounds the lower, water-filled portion of the reactor so as to define with the lining 12 an insulating space 31. The lower portion of the shroud 15 is welded to the portion of the lining 12 covering the bottom of the pressure vessel. The top portion of the shroud 15 overlaps and is spaced from the reduced lower portion 16 of the shroud 14, and the resulting space "S" between said two overlapping portions contains two baffle plates 19 and 20, one of which is secured as an outwardly extending flange to the outer surface of the lower portion 16 of shroud 14 while the other of which is secured as an inwardly extending flange to the inner surface of the confronting top portion of shroud 15. A conduit 18 for the supply of water opens between the baffle plates 19 and 20, and a conduit 21 for the withdrawal of water opens above the baffle plate 20, said conduits having the purpose to maintain a predetermined height of water in space "S."

The insulating space 31, 29 is filled with a gas, preferably nitrogen, which is supplied through a tube 22. Said space contains a plurality of thin steel foils 32 so as to restrict the circulation of the gas. Water that might have condensed in the space 31 is withdrawn through a tube 23.

The bottom of the pressure vessel has a different insulation, as a plurality of tubes extend through said bottom. A metal wire mesh 24 or the like is situated on the bottom so as to produce a layer of stagnant water producing a satisfactory insulation.

The top wall of the reactor contains an opening 28 through which there extends, in known manner, a conventional manipulator 25 for removing used fuel elements from the reactor and for inserting new fuel elements by way of tube 26.

The space "S" between the overlapping portions of the shrouds 14 and 15 forms together with the baffle plates 19 and 20, a water seal which operates in the following manner. When the pressure in the reactor varies in the normal way the level of the water surface 17 in the water seal will vary a little. The width of the water seal should preferably be so large as to make this variation small. The area of the water surface 17 should preferably be 3–10% of the area of the water surface 3. If the pressure were to increase in an abnormal way the water surface 3 would sink below the edge of the shroud portion 16, resulting in steam entering the insulation space 29, 31. If the pressure decreased in an abnormal way the water surface 17 would sink below the edge of the shroud portion 16, resulting in gas passing from the insulation space 29, 31 into the steam space 6. In either abnormal pressure condition, which occurs only on rare occasions, the pressure will be equalized on both sides of the shrouds 14 and 15, and consequently the shrouds may be thin-walled.

The gas in the insulation space 29, 31 cannot be prevented from dissolving in the water in the water seal in space "S." This gas-containing water should be prevented from mixing with the reactor water, as by supplying gas-free water through the conduit 18 while withdrawing the gas-containing water through the conduit 21. The added gas-free water should preferably be cold, for reducing evaporation from the water surface 17.

In the embodiment of FIG. 1 the water seal is situated at a level corresponding to the surface of the normal water level in the reactor, thus ensuring that the water seal is constantly filled with water, unless the pressure is abnormally changed. Alternatively, the water seal can be situated at another place in the reactor, provided it is ensured that there is always water in the water seal. An embodiment of this latter concept is illustrated in FIG. 2.

FIG. 2 merely illustrates the lower portion of a reactor. The reference characters of FIG. 1 have been used for corresponding parts so far as possible. The tank defining the reactor core is denoted 10. This tank will be referred to below as moderator tank, the water in the tank serving as moderator. The tank 10 is surrounded by a second tank 36 which latter will be referred to as a water tank. This water tank has openings 45 in the top-portion of its side wall, and carries a plate 44 which supports the upper end of the boiler elements 1. The steam produced in the boiler elements leaves the water tank through the openings 45, flows downward through the annular space 39 around the water tank and leaves the reactor through the tubes 8′. These tubes extend to some distance above the bottom of the reactor. Consequently, a water layer 43 is formed on said bottom, the water layer and the metal wire mesh 24, in combination, forming a heat-insulating layer.

The thin-walled shroud 14, which surrounds the upper portion of the reactor of FIG. 1, is extended in the reactor of FIG. 2 to reach nearly to the bottom of the reactor. A collar 38, spaced from the confronting lower portion of shroud 14, is fastened to the bottom of the reactor. Said collar, in combination with the lower edge of the shroud 14, forms a space occupied by an annular water seal 37 separating the steam in the space 39 from the gas in the space between the throud 14 and the reactor wall 12. While flowing downward through the space 39 a small quantity of steam will condense on the shroud 14, and the condensed water will flow down into the water seal. For giving an additional guarantee that the water seal shall be constantly filled, water is supplied through a conduit 41. The excess of water is drained off through a conduit 42. The change of water in the water seal is also a safety measure against gas being transported from the insulation space to the steam space by being dissolved in the water in the water seal, as described hereinabove with reference to the corresponding means illustrated in FIG. 1.

I claim:

1. A nuclear reactor, comprising a pressure vessel, a water space in the bottom of the pressure vessel, a reactive core within said water space, said reactor core containing fissile fuel to be cooled by water in said water space, a steam space in the top of the pressure vessel, a thin-walled shroud surrounding the steam space and spaced from the wall of the vessel to provide a relatively narrow annular insulating space for a heat-insulating gas in said insulating space between the shroud and the wall of the pressure vessel, said shroud being provided with a water seal means for separating steam from said insulating space.

2. A nuclear reactor as claimed in claim 1, wherein said water space contains a body of water having a normal level within said vessel, and wherein the water seal means is situated at the normal water level in the reactor, said water seal means constituting a pressure-equalizing means between said steam space and said gas-containing insulating space.

3. A nuclear reactor as claimed in claim 2, wherein the shroud has a first portion surrounding the steam space and a second portion surrounding the water space and defining a relatively narrow insulating space between the wall of the pressure vessel and said second shroud portion, heat-insulating gas being provided in said insulating spaces between the wall of the pressure vessel and the two shroud portions.

4. A nuclear reactor as claimed in claim 3, wherein said water seal means comprises an annular container for a body of sealing water, and wherein the bottom edge of the first shroud portion and the top edge of the second shroud portion are so shaped as to form said annular container part of said water seal means.

5. A nuclear reactor as claimed in claim 1 wherein said reactor contains a conduit for suppying water to the water seal means and a conduit for withdrawing water from the water seal means whereby to maintain a predetermined height of water in said water seal means.

6. A nuclear reactor as claimed in claim 1 wherein the insulating space between the wall of the pressure vessel and the shroud contains means for mechanically restricting circulation of heat-insulating gas in said insulating space.

7. A nuclear reactor as claimed in claim 1, wherein the water space in the bottom of the pressure vessel consists of a separate tank, a space between the bottom of said separate tank and the pressure vessel being arranged as a passage between the steam space in the top of the pressure vessel and steam outlets provided in the bottom of the pressure vessel.

8. A nuclear reactor as claimed in claim 7, wherein said water seal means is situated at the bottom of the pressure vessel.

9. A nuclear reactor as claimed in claim 1, wherein said water seal means is provided with a first conduit means supplying fresh sealing water thereto and with a separate second conduit means withdrawing sealing water therefrom, thereby preventing contamination of water in said water space by gas-containing water from said water seal means.

10. A nuclear reactor as claimed in claim 9, wherein said first conduit means is connected to a source of gas-free water.

11. A nuclear reactor is claimed in claim 9, wherein said conduit means is connected to a source of cold water.

References Cited

UNITED STATES PATENTS

| 3,098,023 | 7/1963 | Schluderberg | 176—52 |
| 3,085,959 | 4/1963 | Germer | 176—60 |
| 3,205,145 | 9/1965 | Margen | 176—54 |

FOREIGN PATENTS

| 924,211 | 4/1963 | Great Britain. |

L. DEWAYNE RUTLEDGE, *Primary Examiner.*

UNITED STATES PATENT OFFICE
CERTIFICATE OF CORRECTION

Patent No. 3,372,092                                   March 5, 1968

Peter Heinrich Erwin Margen

It is hereby certified that error appears in the above numbered patent requiring correction and that the said Letters Patent should read as corrected below.

Column 5, line 9, after "said" insert -- first --.

Signed and sealed this 6th day of May 1969.

(SEAL)
Attest:

Edward M. Fletcher, Jr.
Attesting Officer

Commissioner of Patents